United States Patent
Arndt et al.

(10) Patent No.: US 10,283,113 B2
(45) Date of Patent: May 7, 2019

(54) METHOD FOR DETECTING DRIVING NOISE AND IMPROVING SPEECH RECOGNITION IN A VEHICLE

(71) Applicant: FORD GLOBAL TECHNOLOGIES, LLC, Dearborn, MI (US)

(72) Inventors: Christoph Arndt, Moerlen Rheinland-Plfalz (DE); Mohsen Lakehal-Ayat, Mounatin View, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/393,391

(22) Filed: Dec. 29, 2016

(65) Prior Publication Data

US 2017/0186423 A1    Jun. 29, 2017

(30) Foreign Application Priority Data

Dec. 29, 2015 (DE) .......... 10 2015 226 780

(51) Int. Cl.
| | |
|---|---|
| *G10L 15/20* | (2006.01) |
| *G06K 9/00* | (2006.01) |
| *G10L 21/0216* | (2013.01) |
| *G10L 21/028* | (2013.01) |
| *G10L 15/00* | (2013.01) |

(52) U.S. Cl.
CPC .......... *G10L 15/20* (2013.01); *G06K 9/00798* (2013.01); *G10L 15/00* (2013.01); *G10L 21/028* (2013.01); *G10L 21/0216* (2013.01); *G06K 9/00805* (2013.01)

(58) Field of Classification Search
USPC ........................................................ 704/233
See application file for complete search history.

(56) References Cited

U.S. PATENT DOCUMENTS

| | | | |
|---|---|---|---|
| 7,725,315 B2 | 5/2010 | Hetherington et al. | |
| 8,504,362 B2* | 8/2013 | Lee .......... | G10L 15/20 |
| | | | 704/216 |
| 9,230,531 B2* | 1/2016 | Roggenkamp ....... | G10K 11/002 |
| 2005/0213776 A1* | 9/2005 | Honji ....... | H03G 3/32 |
| | | | 381/86 |

(Continued)

FOREIGN PATENT DOCUMENTS

| | | | | |
|---|---|---|---|---|
| JP | 406067690 A | * | 3/1994 | ............. G10L 3/03 |
| JP | 2001165647 A | * | 6/2001 | ............. G01B 11/30 |

OTHER PUBLICATIONS

German Search Report dated Aug. 26, 2016 for German Application No. 102015222526.7, 7 pgs.

(Continued)

*Primary Examiner* — Abul K Azad
(74) *Attorney, Agent, or Firm* — Frank Lollo; Brooks Kushman P.C.

(57) ABSTRACT

The disclosure concerns a method for recognizing driving noise in a sound signal that is acquired by a microphone disposed in a vehicle. The sound signal originates from the surface structure of the road. According to the disclosure, a segment of the road lying ahead of the vehicle in the direction of travel is observed with a sensor installed in or on the vehicle. Using the observation data obtained, the start and duration of driving noise originating from the surface structure of the road are predicted.

11 Claims, 1 Drawing Sheet

(56) References Cited

U.S. PATENT DOCUMENTS

2008/0015743 A1   1/2008  Haug
2014/0303905 A1  10/2014  Jo et al.
2015/0012267 A1   1/2015  Florian et al.

OTHER PUBLICATIONS

X. Feng, B. Richardson, S. Amman, J. Glass: On using heterogeneous data for vehicle-based speech recognition: a DNN-based approach. Proc. Int. Conf. on Acoustics, Voice and Signal Process. (ICASSP) 2015, Brisbane, Australia, pp. 4385-4389, Apr. 2015.

* cited by examiner

METHOD FOR DETECTING DRIVING NOISE AND IMPROVING SPEECH RECOGNITION IN A VEHICLE

CROSS-REFERENCE TO RELATED APPLICATIONS

This application claims foreign priority benefits under 35 U.S.C. § 119(a)-(d) to DE 10 2015 226 780.6 filed Dec. 29, 2015, which is hereby incorporated by reference in its entirety.

TECHNICAL FIELD

The disclosure concerns a method for identifying driving noise in a sound signal acquired by a microphone disposed in a vehicle as originating from unevennesses or the surface structure of the road, as well as a method for improving automatic speech recognition in a vehicle.

BACKGROUND

Modern motor vehicles often comprise speech processing systems that enable the voice control of vehicle functions. The quality of the speech recognition is affected by external noise. A particular challenge for the speech recognition is sudden changes of the driving noise such as occur when driving over unevennesses in the road such as, for example, humps or potholes or in the event of changes of the surface structure of the road.

U.S. Pat. No. 7,725,315 B1 discloses a method, with which temporary driving noise originating from the road is identified using characteristic signal properties and can be distinguished from speech signals. Suitable signal characteristics are for example pairs of time-related sound events, if first the front wheels and then the rear wheels pass an unevenness of the road, and other characteristic time profiles of signal strengths and frequencies. For better recognition of temporary driving noise, different temporal and spectral characteristics of temporary driving noise are modelled and compared with the just acquired microphone signal.

SUMMARY

The object of the present disclosure is to be able to distinguish driving noise originating from unevennesses or the surface structure the road more reliably from microphone signals recorded in the vehicle.

According to the disclosure, a segment of the road lying ahead of the vehicle in the direction of travel is observed with a sensor installed in or on the vehicle, and using the observation data obtained, the start and duration of driving noise caused by unevennesses or by the surface structure of the road are predicted.

The sensor for observing the segment of the road lying ahead of the vehicle in the direction of travel enables the images of the road surface or other data representing the condition of the road to be obtained in any region of the electromagnetic spectrum, such as for example visible or invisible light or radar waves. Using said images or similar sensor-obtained observation data of the road, it can be determined within the motor vehicle in real time whether and when an observed unevenness of the road will act on the microphone signal, so that suitable countermeasures can be deployed.

The sensor can comprise one or more cameras and/or laser scanners and/or can be a part of a radar system. Forward facing cameras, laser scanners and radars are image acquisition systems that are often already installed in modern motor vehicles as standard or are at least available to order. The image acquisition systems can either obtain two-dimensional images or can scan the road surface line by line. A measurement point cloud or a height profile can be obtained or calculated from this, in which unevennesses of the road can be found particularly easily.

In a preferred embodiment, one or more cameras and/or or other sensors for forward-looking optical obstacle recognition are used as the sensor, such as are known for example from US 2008/0015743 A1. If an obstacle such as, for example, a hump on the road is detected, not only can the driver be warned, but also forced braking can be initiated and/or the suspension and/or damping of the vehicle chassis can be adjusted in advance.

If a sensor for forward-looking optical obstacle recognition is used with the disclosure, the analysis electronics thereof can be used for the present disclosure, because they already provide the times at which adverse effects on the microphone signal of temporary driving noise are to be expected.

Moreover, using the sensor signals the condition of the road can be estimated and it can be estimated whether adverse effects on the microphone signal by strong rolling noise are to be expected. Any predicted adverse effects on the microphone signal can then be counteracted by suitable measures.

The prediction of the driving noise preferably also comprises, besides the start and duration thereof, characteristics of the driving noise in order to be able to compensate the influence of the driving noise more specifically. The characteristics of the driving noise can be previously determined from microphone signals containing no speech signals, i.e. no sound signals that a speech recognition system would see as speech. Suitable microphone signals are available at times at which the speech recognition system is more or less inactive, since the driver is silent, and is awaiting an activation signal.

In a preferred embodiment, microphone signals containing no speech signals are recorded during predicted periods of driving noise originating from unevennesses or the surface structure of the road. As a result, the associated driving noise is obtained in an essentially pure form, which enables the same to be removed from the microphone signal computationally if the microphone acquires speech at a later point in time.

In a preferred embodiment, the method is used for improving automatic speech recognition in the vehicle so that driving noise, such as occurs when driving over humps or potholes or in the event of varying surface structures of the road, can no longer cause speech recognition errors, whether the errors are incorrect interpretations of the contents of voice commands acquired by the microphone and analyzed by a speech recognition system or incorrect interpretations of driving noise as speech.

The method could, however, also be used for other purposes. For example, it is conceivable to improve the quality of telecommunications of the driver with any human conversation partner by measures taken at the correct point in time for reducing the driving noise components in the sound signal acquired and forwarded by the microphone.

A method for improving automatic speech recognition in a travelling vehicle can in particular comprise the steps; observing a segment of the road lying ahead of the vehicle in the direction of travel with a sensor installed in or on the vehicle; using the observation data obtained, determining the location and size of unevennesses of the road lying ahead; checking whether parts of detected unevennesses of the road are expected to be driven over by a tire of the vehicle; causing a microphone installed in the vehicle to acquire a sound signal during the period of travelling over detected unevennesses of the road and using the sound recording obtained to determine and store the influence of unevennesses of the road on the speech recognition; and to clean the sound signals acquired by the microphone of driving noise originating from unevennesses of the road before the sound signals are subjected to the voice recognition.

Moreover, during this, using the observation data obtained, surface structures of the road lying ahead can be determined; sound signals that are acquired are then associated with the determined surface structures while a corresponding surface structure is being driven over; the influence of surface structures on the speech recognition system is determined; and sound signals acquired by the microphone are also cleaned of driving noise originating from the surface structure of the road before the sound signals are subjected to the voice recognition.

A description of exemplary embodiments using the figures follows. In the figures:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
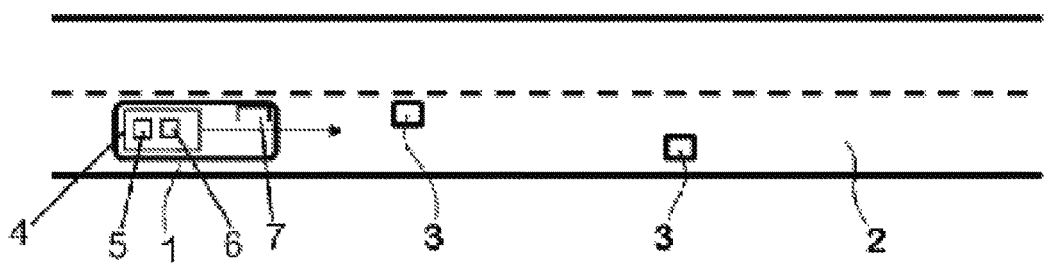
FIG. 1 shows a schematic top view of a travelling motor vehicle.

A motor vehicle 1 shown in FIG. 1 is travelling in the indicated arrow direction on a lane 2 of a road.

The motor vehicle 1 comprises one or more cameras 5 or other observation instruments, such as, for example, laser scanners 6 or radar systems 4, to observe a segment of the road 2 lying in the direction of travel. Forward-facing cameras 5, laser scanners 6 and radar systems 4 are image acquisition systems that are already often installed in modern motor vehicles as standard or at least are available to order. The image acquisition systems can either obtain two-dimensional images or can scan the road surface line by line. The motor vehicle 1 also comprises a microphone 7.

The sensor also includes analysis electronics enabling forward-looking obstacle recognition and in particular the recognition of unevennesses and particular surface structures of the road 2. The operation of such systems that are used to adjust adaptive spring/damper systems to the condition of the road is known to the person skilled in the art.

There are two humps 3 on the road 2 ahead of the motor vehicle 1 in the direction of travel on the path that the wheels of the motor vehicle 1 are expected to take. Said humps 3 on the road 2 can be detected by means of the sensor and the analysis electronics thereof in the motor vehicle 1.

The motor vehicle 1 also comprises a so-called infotainment system that combines the display and operation of for example auto radio, navigation system and various vehicle functions and that also comprises a voice controller by means of a microphone installed in the motor vehicle 1 as part of a speech recognition system.

If the humps 3 in the road 2 are detected by means of the sensor on or in the motor vehicle 1, it is precalculated using the known speed or the profile thereof, at which point in time the humps 3 are driven over by which wheels of the motor vehicle 1 and how long the influence of the corresponding vibration of the motor vehicle 1 on the sound signal acquired by the microphone lasts.

After that, during the period of predicted driving noise originating from driving over the humps 3 or other detected unevennesses of the road 2, measures are taken that prevent or at least make less likely speech recognition errors, in particular incorrect interpretations of the contents of voice commands given at the same point in time or incorrect interpretations of the driving noise as any voice command.

In a very simple exemplary embodiment, the microphone or the speech recognition system is simply deactivated during the predicted period of driving noise.

It is even better to investigate the influence of the humps 3 and other unevennesses of the road on the sound signal at times at which the microphone is not recording speech. These are times at which the speech recognition system is more or less inactive awaiting an activation signal. As a result, in the motor vehicles 1 empirical data are obtained over time that consequently help in reducing speech recognition errors in an active speech recognition system.

In particular, the influence of the humps 3 and of other unevennesses of the road on the sound signal acquired by the microphone is expressed in characteristic noise at the point in time of driving over unevennesses of the road. This enables a pulse response function of the influence of the road on the sound signal to be produced, and indeed not only of the influence of unevennesses of the road such as, for example, the humps 3, but also of surface structures of the road. Thus for example, driving on very rough asphalt or on gravel causes significant noise in the interior of the vehicle that can degrade the quality of the speech recognition.

Figure 2:
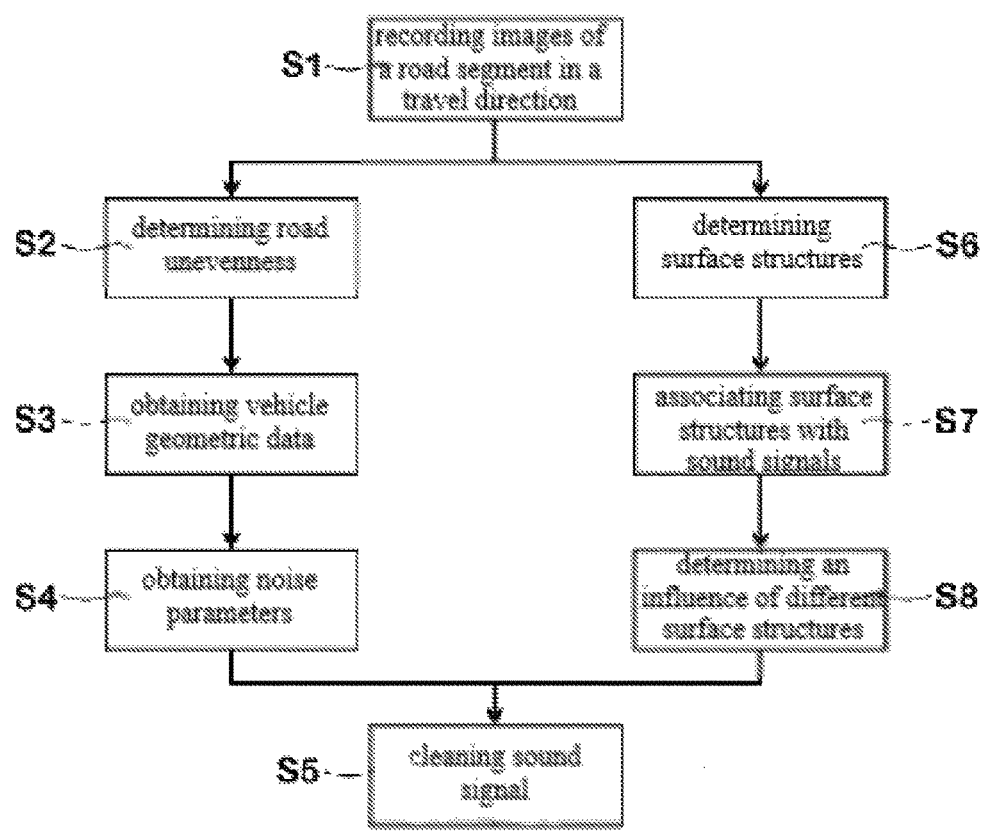
FIG. 2 shows a flow chart of a method for improving automatic speech recognition in a motor vehicle.

A suitable exemplary embodiment of a method for improving automatic speech recognition in a motor vehicle is now described in detail with further reference to FIG. 2.

In a step S1, ongoing images of a segment of the road surface lying in the direction of travel are recorded with the camera sensor installed in the motor vehicle 1.

In a step S2, the location and size of humps 3 or depressions or other unevennesses of the road lying ahead are determined, wherein the size of the unevennesses is given by the length, width and depth thereof. The shape of the edges thereof can also be determined, for example whether the edges of humps 3 are ragged. Thus the condition of the road is obtained by means of the camera sensor observation data.

In a step S3, vehicle geometric data, including in particular the positions of the tires on the motor vehicle 1, and vehicle motion data, including in particular the speed and direction of motion thereof, but also the yaw angle, steering angle etc., are obtained. Said data can for example be called up from a vehicle control module by means of a vehicle CAN bus. Then using the observation data obtained in step S1, a check is made as to whether part of a detected hump 3 or similar that coincides with the vehicle geometric data and the vehicle motion data is expected to be driven over by a tire of the motor vehicle 1. In doing so, angles can also be taken into account at which tires encounter a hump, for example as the shock response when turning is different from during straight-ahead travel.

If it is determined in the step S3 that a part of a detected hump 3 or similar is expected to be driven over by a tire, in a step S4 the start and duration of the resulting anticipated shock is pre-calculated, and during the shock the microphone installed in the motor vehicle 1 is caused to acquire, for example by opening a microphone input with the speech recognition inactive. Using the sound recording obtained, the influence of the hump 3 on the speech recognition system is determined. For this purpose, in particular a pulse response function for encountering the hump 3 and for departing from the hump 3 can be calculated, for example according to the ARMA model (Autoregressive Moving Average), a model for stationary, time-discrete stochastic processes, or according to the ARIMA model (Autoregressive Integrated Moving Average).

Moreover, in the step S4 typical noise parameters for humps 3 or similar that are driven over with time by tires of the motor vehicles 1 are stored, and correlations with the previously calculated pulse response functions are sought and found, which can depend on the size and in particular the length, width, depth and area of the hump parts encountered by tires and also on which tires are affected.

Driving noise and the characteristics thereof such as, for example, the noise parameters obtained in the step S4, of course also depend on the speed and on the type of the vehicle used. The speed is known in the vehicle and can easily be taken into account. Other influencing variables such as, for example, the type of vehicle, do not specifically have to be taken into account with the disclosure, because a determined "acoustic model" of the vehicle within the vehicle, which predicts the noise response to passing unevennesses of the road, includes the complete noise transmission chain through all vehicle materials.

The noise parameters obtained in the step S4, which relate to different road irregularities, and the correlations thereof with pulse response functions are used in the step S5 to clean sound signals that are acquired by the microphone and subjected to speech analysis while the speech recognition is active.

The images acquired by the camera sensor in the step S1 can be additionally used in a step S6 to determine the surface structure of the road lying ahead, in particular the roughness thereof, but also the brightness and color tone thereof, which enable the road material such as, for example, asphalt or concrete to be concluded. Surface structures of the road may possibly be more easily detected if the RGB images usually provided by digital cameras are transformed into other color spaces.

Surface structures determined in the step S6 can be associated in a step S7 with sound signals that are acquired while the associated road segment is being driven over and the speech recognition is inactive.

Using the sound recording obtained, in a step S8 the influence of different surface structures on the speech recognition system is determined, and indeed independently of the determination of pulse response functions in the step S4.

For this purpose, autocorrelation and/or cross-correlation methods can be used in order to determine noise parameters such as, for example, mean amplitude, variance of the interference, asymmetry and similar. Standard procedures for the analysis of stochastic processes can also be used, which for example are known as Doob-Meyer decomposition or Doob-Meyer-Fisk decomposition. Pulse response functions of the influence of different road structures on the sound signal are obtained in this way.

The noise parameters obtained in the step S8, which relate to different identified road surface structures, can also be used in the step S5 to clean sound signals that are acquired by the microphone and analyzed while the speech recognition is active.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A driving noise identification method comprising:
    acquiring, by a microphone on a vehicle, a sound as originating from unevennesses and a road surface structure;
    observing, via camera, a road segment ahead of a vehicle direction of travel;
    predicting a noise start and duration, calculated from driving the road segment, that originates from the unevennesses such that noise characteristics are identified in the sound during a time in which no speech signals are captured by the microphone acquired during the predicted duration of noise originating from the unevennesses; and
    cleaning the sound from the characteristics.

2. The method as claimed in claim 1, wherein the camera is a part of a device for forward-looking optical obstacle recognition, which provides times at which adverse effects of temporary noise on the sound are to be expected.

3. The method as claimed in claim 1, wherein using the road segment, a condition of the road is estimated and times are calculated at which adverse effects of rolling noise on the sound are to be expected.

4. A method for improving automatic speech recognition in a travelling vehicle comprising:
    observing a segment of a road lying ahead of the vehicle in a direction of travel with a camera installed on the vehicle;
    using observation data obtained from the camera to determine a location and size of a hump on the segment lying ahead of the vehicle in the direction of travel;
    checking if the hump on the segment is expected to be driven over by a tire;
    acquiring a sound signal, during a period of driving over the hump, via a microphone installed in the vehicle;
    using the sound signal to determine an influence of the hump; and
    cleaning the sound signal of the influence of the hump before the sound signal is subjected to speech recognition by a speech recognition system.

5. The method as claimed in claim 4 further comprising:
    using the observation data to determine a surface structure of the segment lying ahead of the vehicle in the direction of travel;
    associating the surface structure with sound signals that are acquired while the corresponding surface structure is being driven over by the vehicle;
    storing an influence of the surface structure on the speech recognition system; and cleaning the sound signals of driving noise originating from the surface structure of the road that are acquired by the microphone before the sound signals are subjected to speech recognition.

6. A vehicle speech recognition system comprising:
a microphone that detects a sound indicative of a road surface structure and a depression in a road segment;
a radar system configured to observe the road segment ahead of a travel direction for the depression; and
a controller configured to, in response to an identification of sound characteristics indicative of a period of driving over the surface structure and a noise start and duration prediction of the depression calculated from the radar system to identify characteristics in the sound occurring during a time in which no speech signals are captured by a microphone, clean the sound of the characteristics before the sound signal is subjected to speech recognition.

7. The speech recognition system of claim 6, wherein the controller is further configured to predict a start and duration of the driving noise from the surface structure.

8. The speech recognition system of claim 6, wherein the controller is further configured to, in response to data from the radar system, associate the sound with the surface structure.

9. The speech recognition system of claim 6, wherein the controller is further configured to, in response to data from the radar system, estimate a condition of the road wherein adverse effects of rolling noise is in the sound.

10. The speech recognition system of claim 9, wherein the controller is further configured to, in response to the condition of the road, predict noise characteristics.

11. The speech recognition system of claim 6, wherein the radar system includes a camera and a laser scanner.

* * * * *